United States Patent Office 2,855,424
Patented Oct. 7, 1958

2,855,424

O-(HALOPHENYL) PHOSPHORODIHYDRAZIDO-THIOATES

Etcyl H. Blair, Midland, Mich., assignor to The Dow Chemical Company, Midland, Mich., a corporation of Delaware No Drawing. Application April 30, 1956
Serial No. 581,360

6 Claims. (Cl. 260—461)

This invention is concerned with the O-(halophenyl) phosphorodihydrazidothioates having the formula

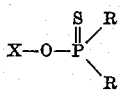

In this and succeeding formulas X represents halophenyl and each R represents a hydrazido, phenylhydrazido or 2,2-dimethyl-hydrazido radical. These new compounds are crystalline solids somewhat soluble in several common organic solvents and of very low solubility in water. They are useful as bactericides and fungicides and are adapted to be employed as active toxic constituents of compositions for the control of such common bacterial and fungal organisms as *Rhizopus nigricans*, *Aspergillus terrus* and *Salmonella typhosa*.

The new compounds may be prepared by reacting hydrazine, phenylhydrazine, or 2,2-dimethylhydrazine with a phosphorodichloridothioate of the formula

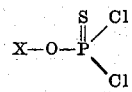

The reaction is carried out in the presence of an inert organic solvent such as benzene, toluene or methylene chloride. The reaction is somewhat exothermic and takes place smoothly in the temperature range of 0° to 50° C. with the formation of the desired product and hydrazine or substituted hydrazine hydrochloride. The temperature may be controlled by regulating the rate of contacting the reactants and by external cooling. Good results are obtained when employing at least two and preferably four molecular proportions of the hydrazine reagent with each molecular proportion of the phosphorodichloridothioate reagent.

In carrying out the reaction, the phosphorodichloridothioate reagent dispersed in the reaction solvent is added portionwise to the hydrazine reagent dispersed in the same solvent. If desired, the hydrazine reagent only may be added to a solution of the phosphorodichloridothioate reagent in the reaction solvent. The addition is carried out with stirring and at a temperature of 0° to 50° C. Upon completion of the reaction, the reaction mixture is washed with water to dissolve the solid hydrochloride formed or the hydrochloride may be removed by filtration. The reaction solvent is then removed by evaporation or distillation under reduced pressure to obtain the desired product as a residue.

The following examples illustrate the invention but are not to be construed as limiting:

EXAMPLE 1

*O-(2,4,5-trichlorophenyl) phosphorodihydrazidothioate*

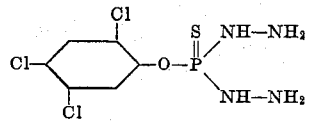

A solution of 330.8 grams (1.0 mole) of O-(2,4,5-trichlorophenyl) phosphorodichloridothioate in 500 milliliters of benzene was added portionwise with stirring to a solution of 250.3 grams (5.0 moles) of hydrazine hydrate in one liter of benzene. The addition was carried out in one hour and at a temperature of 15° C. The reaction mixture was stirred for three hours at about 15° C. and then for one hour at room temperature to complete the reaction. A white solid consisting of a mixture of the desired product and hydrazine hydrochloride was removed by filtration. This solid was dissolved in 200 milliliters of dimethylformamide and the resulting solution diluted with water to precipitate the desired product. Upon filtering there was obtained as a crystalline solid an O-(2,4,5-trichlorophenyl) phosphorodihydrazidothioate product. This product was recrystallized from methanol and found to melt at 152°–153° C.

EXAMPLE 2

*O-(2,4,5-trichlorophenyl) 2,2,2',2'-tetramethyl phosphorodihydrazidothioate*

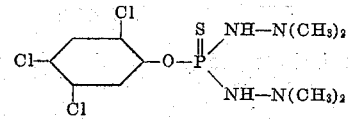

A solution of 66.1 grams (0.2 mole) of O-(2,4,5-trichlorophenyl) phosphorodichloridothioate in 200 milliliters of methylene chloride was added portionwise with stirring to a solution of 27 grams (0.45 mole) of 2,2-dimethylhydrazine in 200 milliliters of methylene chloride. The addition was carried out in 1.5 hours and at a temperature of 5° to 15° C. Following the addition, the reaction mixture was allowed to warm to room temperature and then heated at 40° C. for 30 minutes to complete the reaction. Upon completion of the reaction, the reaction mixture was washed with water and the solvent evaporated to obtain an O-(2,4,5-trichlorophenyl) 2,2,2',2'-tetramethyl phosphorodihydrazidothioate product as a solid residue. This product was recrystallized from a methanol-water mixture and then from methylcyclohexane and found to melt at 123°–125° C.

EXAMPLE 3

*O-(2,4-dichlorophenyl) 2,2'-diphenyl phosphorodihydrazidothioate*

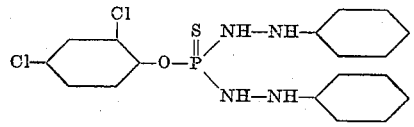

A solution of 29.5 grams (0.1 mole) of O-(2,4-dichlorophenyl) phosphorodichloridothioate in 300 milliliters of methylene chloride was added portionwise with stirring to a solution of 54 grams (0.5 mole) of phenylhydrazine in 200 milliliters of methylene chloride. The addition was carried out in one hour and at a temperature of 10° to 15° C. After the addition the reaction mixture was heated at 40° C. for one hour to complete the reaction. The reaction mixture was then washed with water and the methylene chloride evaporated to obtain as a solid residue an O-(2,4-dichlorophenyl) 2,2'- diphenyl phosphorodihydrazidothioate product. This product was recrystallized from ethanol and found to melt at 156°–157° C.

EXAMPLE 4

*O-(2-chlorophenyl) phosphorodihydrazidothioate*

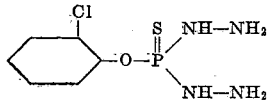

A solution of 65.1 grams (0.25 mole) of O-(2-chlorophenyl) phosphorodichloridothioate in 100 milliliters of methylene chloride was added portionwise with stirring to a solution of 50 grams (1.0 mole) of 100 percent hydrazine hydrate in 100 milliliters of methylene chloride. The addition was carried out in 35 minutes and at a temperature of 5° to 10° C. After the addition the reaction mixture was stirred for 30 minutes at room temperature to complete the reaction. The reaction mixture was then treated with water to dissolve the hydrazine hydrochloride formed and the resulting suspension filtered to obtain an O-(2-chlorophenyl) phosphorodihydrazidothioate product as a white solid. This product was recrystallized from ethanol and found to melt at 145°–147° C.

EXAMPLE 5

*O-(2-chloro-5-bromophenyl) phosphorodihydrazidothioate*

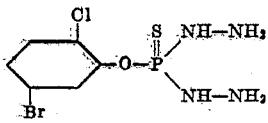

Hydrazine hydrate (15 grams, 0.3 mole) was added portionwise with stirring to a solution of 17 grams (0.05 mole) of O-(2-chloro-5-bromophenyl) phosphorodichloridothioate in 100 milliliters of methylene chloride. The addition was carried out in 20 minutes and at a temperature of 10° C. After the addition the reaction mixture was stirred at room temperature for one hour to complete the reaction. The hydrazine hydrochloride formed was dissolved in water and the reaction mixture filtered. There was obtained as a white solid an O-(2-chloro-5-bromophenyl) phosphorodihydrazidothioate product. This product was extracted repeatedly with boiling methanol, dried and found to melt at 190°–191° C.

In a similar manner other O-(halophenyl) phosphorodihydrazidothioates may be prepared as follows:

O-(4-bromophenyl) 2,2,2',2'-tetramethyl phosphorodihydrazidothioate by the reaction of 2,2-dimethylhydrazine and O-(4-bromophenyl) phosphorodichloridothioate.

O-(3,4-dichlorophenyl) phosphorodihydrazidothioate by the reaction of hydrazine hydrate and O-(3,4-dichlorophenyl) phosphorodichloridothioate.

O-(2,4,6-tribromophenyl) 2,2'-diphenyl phosphorodihydrazidothioate by the reaction of phenylhydrazine and O-(2,4,6-tribromophenyl) phosphorodichloridothioate.

O-(2-bromophenyl) phosphorodihydrazidothioate by the reaction of hydrazine hydrate and O-(2-bromophenyl) phosphorodichloridothioate.

The new O-(halophenyl) phosphorodihydrazidothioates are effective as bactericides and fungicides and are adapted to be employed for the control of bacterial and fungal organisms. In a representative operation, solid nutrient agar media saturated with O-(2,4,5-trichlorophenyl) phosphorodihydrazidothioate were streaked with suspensions of viable spores of *Aspergillus terreus* and *Rhizopus nigricans* and incubated at 30° C. for three days. At the end of this period, complete inhibition of the test organisms was observed.

The O-(halophenyl) phosphorodichloridothioates employed as starting materials may be prepared by reacting a molecular excess of phosphorus thiochloride with an alkali metal salt of a halophenol. Good results are obtained when employing from two to four moles of $PSCl_3$ per mole of the alkali metal phenolate. The phenolate, preferably as the sodium salt, is added portionwise with stirring to the phosphorus thiochloride and the mixture subsequently warmed for a short time to complete the reaction. The crude reaction mixture is filtered and the filtrate fractionally distilled under reduced pressure to separate the product.

I claim:

1. An O-(halophenyl) phosphorodihydrazidothioate having the formula

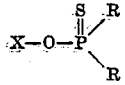

in which X represents a member of the group consisting of chlorophenyl and bromophenyl and each R represents a member of the group consisting of hydrazido, phenylhydrazido and 2,2-dimethylhydrazido radicals.

2. O - (2,4,5 - trichlorophenyl) phosphorodihydrazidothioate.

3. O-(2,4,5-trichlorophenyl) 2,2,2',2'-tetramethyl phosphorodihydrazidothioate.

4. O-(2,4-dichlorophenyl) 2,2'-diphenyl phosphorodihydrazidothioate.

5. O-(2-chlorophenyl) phosphorodihydrazidothioate.

6. O-(2-chloro-5-bromophenyl) phosphorodihydrazidothioate.

References Cited in the file of this patent

UNITED STATES PATENTS 2,552,538    Drake et al. _____ May 15, 1951

OTHER REFERENCES

Autenrieth et al., "Chem. Abstracts," vol. 19 (1925), pages 2325–6.